(12) United States Patent
Ball, IV

(10) Patent No.: US 8,496,740 B1
(45) Date of Patent: Jul. 30, 2013

(54) APPARATUS FOR SEPARATING OIL WELL PRODUCTS

(76) Inventor: Will D. Ball, IV, Bixby, OK (US)

( * ) Notice: Subject to any disclaimer, the term of this patent is extended or adjusted under 35 U.S.C. 154(b) by 260 days.

(21) Appl. No.: 13/190,560

(22) Filed: Jul. 26, 2011

(51) Int. Cl.
*B01D 19/00* (2006.01)

(52) U.S. Cl.
USPC ............... 96/183; 95/253; 96/211; 96/212; 210/537

(58) Field of Classification Search
USPC ............. 95/253; 96/183, 184, 185, 186, 211, 96/212; 210/537
See application file for complete search history.

(56) References Cited

U.S. PATENT DOCUMENTS

| | | | |
|---|---|---|---|
| 554,598 A * | 2/1896 | Gilmore | 96/183 |
| 2,420,115 A * | 5/1947 | Walker et al. | 95/158 |
| 2,614,649 A * | 10/1952 | Walker et al. | 95/252 |
| 5,030,255 A * | 7/1991 | Tarpley | 96/183 |
| 5,073,266 A | 12/1991 | Ball, IV | |
| 5,254,076 A | 10/1993 | Chow et al. | |
| 5,622,621 A | 4/1997 | Kramer | |
| 5,714,068 A | 2/1998 | Brown | |
| 6,042,722 A | 3/2000 | Lenz | |
| 6,089,381 A | 7/2000 | Gordon | |
| 6,409,808 B1 * | 6/2002 | Chamberlain et al. | 96/182 |
| 6,554,141 B2 | 4/2003 | Carriere | |
| 6,638,437 B2 | 10/2003 | Terrien et al. | |
| 7,422,683 B2 | 9/2008 | Park | |
| 7,753,215 B2 | 7/2010 | Gigas et al. | |
| 2008/0251441 A1 * | 10/2008 | Gibbs | 210/242.3 |

* cited by examiner

*Primary Examiner* — Jill Warden
*Assistant Examiner* — Douglas Theisen
(74) *Attorney, Agent, or Firm* — Molly D. McKay

(57) ABSTRACT

An atmospheric oil, water and gas separator designed for oilfield applications having ground level inlet, internal water leg, internal piping, a degassing chamber, a horizontal inlet fluid swirl wing distributor that creates centrifugal spiraling of inlet fluids to slow and increase flow residence time, a horizontal swirl wing baffle above the inlet that minimizes oil re-entrainment by preventing turbulence at the oil-water interface, an inverted upper spreader that prevents solids plugging and performance deterioration, an oil conduit extending from the lower surface of the inverted upper spreader to the oil layer to prevent re-entrainment of separated oil in the inlet water turbulent zone, an externally adjustable slide tube for the water leg spillover weir tube, engineered water and oil spillover weirs that prevent separator upsets and overflows, and a water leg adjuster providing fine tuning of the height of the water leg from outside the vessel without shutdown.

18 Claims, 2 Drawing Sheets

APPARATUS FOR SEPARATING OIL WELL PRODUCTS

BACKGROUND OF THE INVENTION

1. Field of the Invention

The present invention is an apparatus for separating oil well products. More specifically, the invention is an atmospheric oil, water, solids, and gas separator designed for oilfield applications.

2. Description of the Related Art

Separators that are intended to separate oil, water, solids, and gas from a mixture, such as a mixture produced by an oil well, have been in use for years. One such separator was designed by the present inventor and is the subject of U.S. Pat. No. 5,073,266 which issued on Dec. 17, 1991 for an Apparatus for Separating Commingling Heavier and Lighter Immiscible Fluids. However, these separators have several problems or shortcomings.

One such problem is that most separators do not have any way to adjust the level or height of the oil-water interface within the separator tank in response to varying operational conditions. The level of the interface is critical to efficient separation. Separators that have means for adjusting the height of the oil-water interface do not have a good and easy way to adjust the location or level of the oil-water interface without shutting down the separator.

Another problem has been that most separators are not designed to handle large slugs of oil or water, and when the capacity of those separators has been exceeded during upset times, oil spills have occurred.

Still another problem with prior separators is that the inlet connection has not been at or near ground level which makes connecting the separator to the production well or other source of fluid to be separated much more difficult, time consuming, expensive, and most importantly, quite dangerous. Also any elevated connection is more difficult to service.

A further problem with prior separators has been that the concave side of the internal upper spreader has been oriented upward so that the spreader serves as a bowl for collecting solids. As this bowl fills, the solids tend to obstruct the inlets into the tank of the separator and shut off flow into the separator. Separation efficiency suffers. This finally results in the need to shut the unit down, drain it and clean out the solids from the top of the bowl shaped internal upper spreader.

Still a further problem with prior separators is that they re-entrain separated oil into the water layer due to disruption of the oil-water interface by the turbulence and slugs from the incoming fluid into the tank. Additionally, prior separators have proven to be less efficient as they tend to re-entrain otherwise separable oil in the water phase as a result of making separated oil droplets that are formed below where the incoming fluid enters the tank to rise up through the turbulent incoming water in order to reach the oil-water interface and the oil layer above the oil-water interface.

Still another problem with prior separators is that the flow within the tank does not promote sufficient retention time and does not slow down velocity of the flow sufficiently to allow the entrained oils to separate from the water.

A further problem with prior separators is that they do not have a degassing chamber or other means for allowing gas to separate from the mixture initially upon entering the separator to reduce the turbulence that the entrained gas causes as the mixture enters the separation section of the separator and the gas bubbles up through both the oil-water interface and the oil-gas interface before reaching the gas layer or section located at the top of the tank.

A final problem is that the water spillover weir and the oil spillover weir of prior separators are generally not engineered with sufficient capacity to accommodate extremely large loadings, surges, and slugs of water and oil, resulting in unit upset and oil spills The present invention addresses all of these problems and shortcomings and provides several improvements over prior art separators.

SUMMARY OF THE INVENTION

The present invention is an atmospheric oil, water solids, and gas separator designed for oilfield applications that has several new features and benefits over previous separators for oil field applications.

A first new feature is its ground level inlet with internal piping that is safer and easier to install and service. This eliminates the need for man-lifts or OSHA ladders, since installation crews remain at ground level.

A second feature is its degassing chamber that eliminates mixing of the products that are to be separated. Specifically, the degassing chamber removes entrained gases from the oil and water mixture which enters the separator, removing the mixing energy it would otherwise impose on the liquids and solids to be separated.

A third feature is its swirl wings that create centrifugal spiraling of inlet fluids. The spiraling path of flow allows more time for the oil and water to separate within the separator, and directs the flow to the very large inside tank wall of the vessel, which acts then like a large coalescing baffle. Any oil droplets impinging on this surface separate and migrate upward into the oil layer.

A fourth feature is its swirl wing upper flow directing baffle that minimized oil re-entrainment in the water. The water and oil mixture enters the tank just below the oil-water interface and the baffle which is located between the tank inlet and the oil-water interface prevents the interface from being disturbed and re-entraining oil into the oil and water mixture near the oil-water interface.

A fifth feature is its inverted upper spreader that prevents plugging. Previous separator designs did not invert the upper spreader and formed a bowl into which solids would accumulate, eventually restricting flow of the oil and water mixture into the tank. By inverting the upper spreader, plugging does not occur and solids fall off of the convex upper surface of the upper spreader and migrate to the bottom of the tank where they can be removed via a tank drain.

A sixth feature is its oil conduit that prevents re-entrainment. The oil conduit is a pipe that extends from the lower surface of the inverted upper spreader and provides a direct route for oil separated beneath that spreader to enter the oil layer without being re-entrained in the inlet water turbulent zone where the inlet water, oil, and solids are entering the tank.

A seventh feature is its slide tube for the water leg. The slide tube allows the water leg to be effectively shortened or lengthened to allow for the interface to be adjusted without stopping the flow of fluid or shutting the separator down.

An eighth feature is its engineered water spillover weir that prevents separation upsets. By using the proper diameter of pipe to create the water spillover weir, the flow over the spillover weir is proportional to the flow rate of the fluids coming into the separator.

A ninth feature is its engineered oil spillover weir that prevents vessel overflows and oil spills. By having a large capacity oil spillover weir, the maximum elevation increase during high slug flows of oil is absorbed in a very shallow crest height over the weir so the overall rise in oil elevation remains a very small fraction of the available space in each vessel. This prevents tank overflows and oil spills.

A tenth feature is its external water leg adjuster that provides fine tuning of the height of the water leg without the need for shutdowns.

Each of these features will be described in detail hereafter.

DETAILED DESCRIPTION OF THE PREFERRED EMBODIMENT

Figure 1:
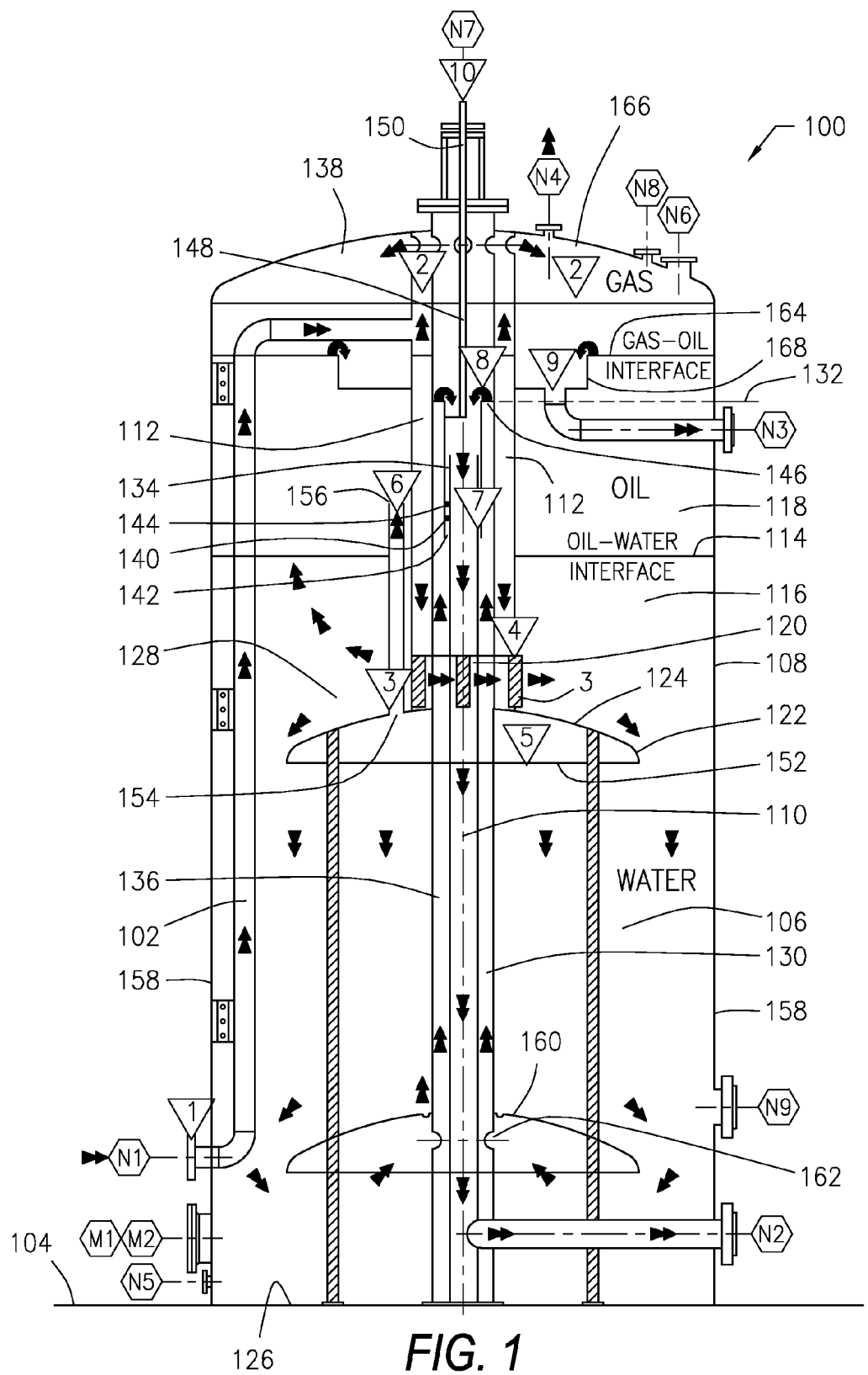
FIG. 1 is diagram of a separator that is constructing in accordance with the present invention, with arrows indicating the flow of materials through the separator.

Referring now to FIG. 1, there is illustrated a separator apparatus 100 for separating oil well products. This is an atmospheric oil, water and gas separator 100 designed for separating applications such as those found in the oil field. Although the invention is described for use with oil field products, the invention is not so limited and could be used for other applications.

The separator 100 is a cylindrical tank or vessel 108 with an inlet 1 located near ground or grade level 104. The inlet 1 that admits the oil well products or fluids via inlet piping N1 into internal piping 102 contained within the tank 108. The fluids flow through the piping 102 and come to a center conduit 112 which extends upward into a degassing chamber 2 to which entrained gases in the fluid can rise. Gases that accumulate in the degassing chamber 2 exit the tank 108 via a gas outlet N4 provided in the top 138 of the tank 108. The center conduit 112 also extends downward to terminate at tank fluid inlets 120.

The top 138 of the tank 108 also includes a gauge or thief hatch N6, gas outlet N4 and a tank level device N8. The thief hatch N6 is needed to collect quality samples, and to measure the depth of the water, oil and emulsion liquid layers. The tank level device N8 is an automated electronic device which determines the gas layer depth, the oil layer depth, the emulsion layer depth, and the overall water layer depth. When incorporated, it precludes the need to ever open the thief hatch N6, thus minimizing the escape of volatile organic compounds (VOCs) into the atmosphere and minimizing air pollution.

The fluid exits the center conduit 112 via the tank fluid inlets 120 and is forced outward in a spiral swirling fashion from the center 110 of the tank 108 by swirl wings 3 that attach to the center conduit at the tank fluid inlets 120 that impart a circular rotation in an ever increasing radius, helical flow path to the fluid as it exits the inlets 120. See FIGS. 2 and 3 for an illustration of the swirl wings 3. This helical flow path maximizes the time the inlet fluid remains in the inlet separation zone 106 which is the area adjacent to and surrounding the tank fluid inlets 120 and the swirl wings 3.

Figure 3:
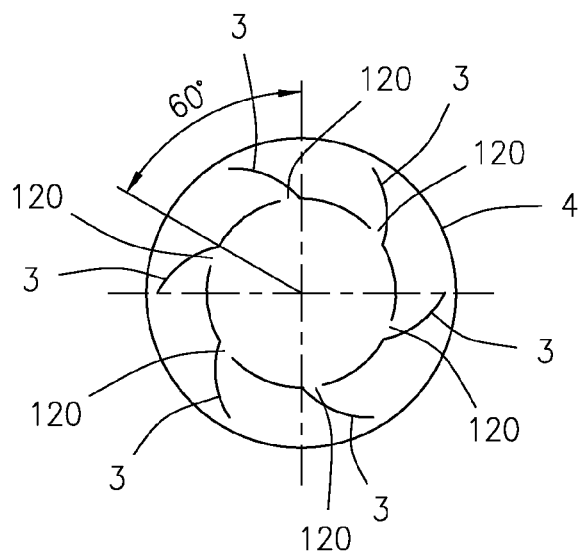
FIG. 3 is a top plan view of the swirl wings of FIG. 2.
Figure 2:
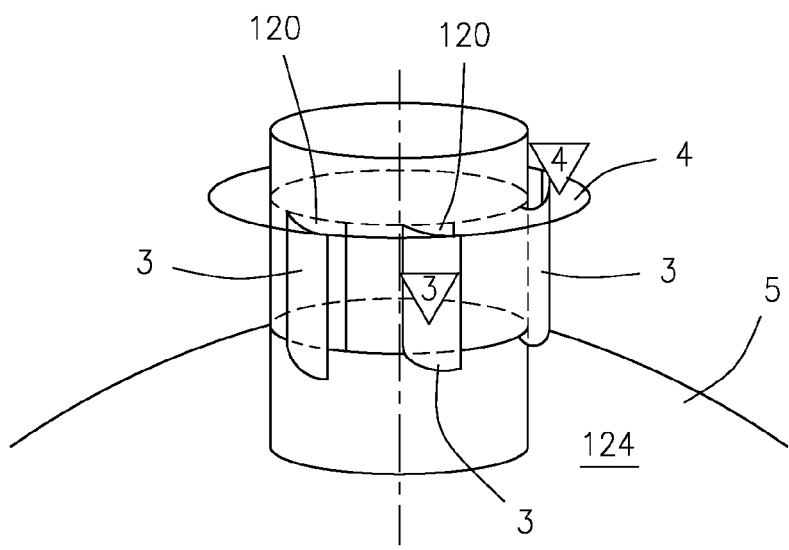
FIG. 2 is an enlarged isometric view of the swirl wings.

Also referring to FIGS. 2 and 3, immediately above the tank fluid inlets 120 is a flat horizontal plate that forms an upper swirl wing baffle 4 that prevents the movement of the fluid in the inlet separation zone 106 located below the baffle 4 from disturbing the oil-water interface 114 located above the baffle 4. The baffle prevents the oil-water interface 114 from being disturbed, thereby preventing re-entrain or oil from the oil layer or section 118 of the tank 108 which is located above the oil-water interface 114 back into the water layer or section 116 of the tank 108 that is located below the oil-water interface 114.

Solids within the fluid fall out of the fluid as the fluid moves in a helical flow path within the inlet separation zone 106 and the solids falls down onto a convex upper surface 124 of an inverted upper spreader 5 located just below the tank fluid inlets 120 and swirl wings 3. Solids accumulate on the convex upper surface 124 and are washed off by the helical flow of their inlet fluid, eventually falling off of the downwardly extending outer dish edges 122 of the spreader baffle 5 and migrate, under gravitational pull, to the bottom 126 of the tank 108. Solids that accumulate in the bottom 126 of the tank 108 are removed via a tank drain N5 provided in the bottom of the tank. A washout connection N9 and one or more cleanout man ways M1 and M2 are also provided at or near the bottom of the tank 108 to allow the tank 108 to be cleaned.

Oil begins to separate from the water as the fluid travels first through the inlet water turbulent zone 128 which is the area surrounding the tank fluid inlets 120 and then out into the inlet separation zone or quiescent separation zone 106 which extends into the bottom half of the tank 108. As the oil begins to separate from the water in the quiescent separation zone 106, some of the separated oil accumulates on the bottom 152 of the inverted upper spreader 5. The oil that accumulates on the bottom or underside 152 of the inverted upper spreader 5 moves directly into the oil layer or section 118 without going through the oil-water interface 114 by being convey via an oil conduit 6 that has a lower opening 154 at the bottom 152 of the inverted upper spreader 5 and an upper opening 156 in the oil layer or section 118 above the oil-water interface 114.

Smaller amounts of the oil that separate from the water moves directly upward to the oil layer or section 118 by passing through the oil-water interface 114, but because the volume of oil that reaches the oil-water interface is small, this does not cause disruption of the oil-water interface 114 and does not result in re-entrainment of oil in the water layer 116.

An engineered oil spillover weir 9 is provided in the tank 108 at a gas-oil interface 164 located where the oil layer or section 118 of the tank 108 meets the upper gas layer or section 166 of the tank 108. The separated oil flows over the top of the spillover weir 9 into the large oil collector 168 and then out of the tank 108 via an oil outlet N3 provided in the tank 108. The oil spillover weir 9 is engineered of a sufficiently large size so that even large slugs of oil passing through the separator 100 will not exceed the capacity of the oil collector 168 and thus it prevents any chance of an oil spill.

The water continues to swirl outward within the tank 108 and is forced to the outer walls 158 of the tank 108 by the inverted upper spreader 5. Since the annulus between the upper inverted spreader 5 and the tank wall 158 create a flow restriction, the restriction creates an eddy current that pulls the downward spiraling fluids in and under this upper spreader 5 to optimize the entire vessel 108 at this point. From there, the water flows in a near-perfect plug flow path downward within the quiescent separation zone 106 of the tank 108 which is located between the upper and lower inverted spreader 5 and 160 the tank 108. As the water slowly descends within the quiescent separation zone 106, solids fall to the bottom of the tank and oil droplets rise to the oil-water interface. Eventually, the water reaches a lower inverted spreader 160 which again forces flow to the outer walls 158 of the tank 108. The water then flows under the lower inverted spreader 160 and into water leg inlet holes 162 of a water leg 130 provided under the lower inverted spreader 160.

The water leg 130 extends upward centrally within the tank 108, passing consecutively through the lower inverted spreader 160 and the upper inverted spreader 5 until it reaches the top of an adjustable height slide tube 7 and its spillover weir that forms the top of a riser pipe 136. The liquid flow upward in the water leg 130 and flows over the top or weir area of the slide tube 7 into the riser pipe 136. The top of the slide tube 7 serves as a level controlling spillover point 132 and level controlling weir 8 which controls the level of the oil-water interface 114. The riser pipe 136 serves as an engineered water spillover weir 8. The riser pipe 136 is engineered to be of a sufficient size to accommodate the flow design for the particular separator application.

The height of the slide tube 7 is adjusted via a slide rod or worm gear 148 that attaches to the slide tube 7 and with an external water leg adjuster 10. The adjuster 10 is a slide rod or worm gear 148 that connects to the internal slide tube 7 of the water leg 130, and extends through a combination lubricator and seal 150 to outside the vessel 108 where the operator can access it. By moving the rod or worm gear 148 up or down, the operator can adjust the elevation of the adjustable water leg 130 at the level controlling spillover point 132 formed by the top 146 of the slide tube 7. The external water leg adjustor 10 is mounted on water leg flange N7. The adjustor 10 is used to raise and lower the slide tube 7 relative to the riser pipe 136. In so doing, the height of the spillover point 132 of the water leg 130 is raised or lowered, raising or lowering the oil-water interface 114 inside the tank 108. The tank 108 is like one leg of a manometer, equalized with the other leg at the bottom. The other leg is formed within the water leg 130 and its effective height is the height of the spillover point 132 of the slide tube 7. By raising or lowering the slide tube 7 the varying level in one side of this manometer-like device equalizes with the level in the other side. Given that the tank side is filled with a mixture of fluids (oil and water) and the water leg other side is filled only with water, the water leg level is always slightly lower than the tank side, as is illustrated in FIG. 1.

The slide tube 7 which is also known as the oversized pipe or spillover weir is movably sealed via O-rings 144 to the riser pipe 136. The O-rings 144 seal the oversized pipe 7 to the riser pipe 136, thereby forcing all water that flows upward around and over the top 146 of the oversized pipe or slide tube 7 to flow downward within the riser pipe 136. The o-rings 144 are retained in o-ring grooves 140 provided at the bottom 142 of the slide tube 7 and seal between the slide tube 7 and a smooth upper end 134 of the riser pipe 136 so that the slide tube 7 is in a movable, height-adjustable, telescopic relationship relative to the riser pipe 136.

The riser pipe 136 is located within the water leg 130 and extends downward to the bottom of the tank where it is in fluid communication with a water outlet N2 for the tank 108. The separated water that spills over the water spillover weir 8 enters the riser pipe 136 and flows downward to the water outlet N2 where it exits the tank 108.

The present invention has several new features and benefits over previous separators for oil field applications that make this separator 100 superior to previous designs. Each of these features will be described hereafter in detail.

A first new feature is its ground level inlet 1 with internal piping 102. Fluid produced from an oil well enters the inlet 1 via inlet piping N1. In most oilfield atmospheric separators the inlet piping connection is 20+ feet above grade 104 and all piping is external. Installing piping in such a location is identified by OSHA as being potentially dangerous. Extra care must be exercise when making such connections. Near-grade elevation 104 of the inlet piping 1 in this design allows installation personnel to connect to the separator 100 without leaving ground level, where it is easy, fast, and safe. No man lifts, safety harnesses, or scaffolding are required to connect the piping to this new design 100, rendering installation and operation of this separator 100 safer and more cost effective for its owner.

A second feature is its degassing chamber 2 that eliminates mixing of the products that are to be separated. This design incorporates an internal degassing chamber 2 to remove entrained and evolving natural gas from the liquid stream that enters through inlet 1 before the liquid stream enters the quiescent separation zone 106 located in the lower portion of the cylindrical tank or vessel 108. Since any remnant gas evolves upward in a liquid environment due to the vast density difference, gas being much lighter, this upward evolution in a liquid separation zone would cause violent mixing. And, since mixing is the opposite of separation, the degassing chamber 2 eliminates gas mixing and dramatically enhances separation of the remaining liquid mixture. Gas is removed from the degassing chamber via a gas outlet N4 located at the top 138 of the tank 108 and the produced gas is generally vented, flared, or sent to a vapor recovery unit or VRU. Also located at the top 138 of the tank 108 are a tank level device N8 and a gauge or thief hatch N6.

A third feature is its swirl wings 3 that create centrifugal spiraling of inlet fluids as they move into the quiescent separation zone 106. The separation velocity of immiscible fluids is defined by Stoke's Law. Since separation velocity is complicated by the dynamic or non-static, fluid in motion flow condition typical of processing in industry, one key to enhancing separation is to maximize the time any fluid remains in any single zone or in any give trajectory. The flow path of fluid traveling in a straight line can be lengthened considerably if the fluid is directed in a simple Archimedean spiral, or helical flow path in the more typical three dimensional model. The inlet fluid in the present separator 100 enters via tank fluid inlets 120 in the center 110 of the cylindrical tank or vessel 108 as it exits the center conduit 112 through swirl wings 3 that impart a circular rotation in an ever increasing radius, or a flow path that is a three dimensional spiral, better described as a helix. This flow path maximizes the time the inlet fluid remains in the inlet separation zone 106, allowing smaller and smaller oil droplets to rise out of the ever-slowing helical flow path, and resulting in enhancing separation.

A fourth feature is its swirl wing baffle 4 that minimized re-entrainment. A flat baffle plate 4 is used just above the swirl wings 3 to minimize the effect of the higher velocity inlet fluid on the oil layer at the oil water interface 114 located immediately above the swirl wing baffle 4. By eliminating the eddy current effect of the high velocity fluid at the center 110 of the vessel 108, where the helix flow begins, the fragile gradient of oil and water at the oil-water interface 114 just above the baffle 4 is left undisturbed. As the helical flow is established, the inlet fluid velocity slows, so that as the flow reaches the outer circumference of the swirl wing baffle 4, the velocity has reduced sufficiently so as to impart no eddy current forces on the oil-water interface layer 114 just above. This allows all separated oil droplets to continue to rise upward through the water layer 116 that is located below the oil-water interface 114, and allows any water droplets falling downward out of the oil layer 118 located above the oil-water interface 114 to continue undisturbed in their downward flow path, thus further enhancing the separation of oil from water and water from oil.

A fifth feature is its inverted upper spreader 5 that prevents plugging. Previous separator designs placed their upper spreader baffle with its outer edges facing upward. While this maximized horizontal planer flow above this baffle, its inverted dish configuration created a catch basin for all manner of naturally occurring solids to accumulate. As this accumulation progressed, the tank fluid inlets 120 became constricted, compromising the process. The only remedy was to stop the process, empty the vessel, and clean the dish of the upper baffle. In the present invention, the upper spreader baffle 5 is inverted with the outer dish edges 122 facing downward. The domed walls of the baffle dish 5 allow for any solids entering the vessel 100 to slough off of the convex upper surface 124 of the dish 5 and fall to the bottom 126 of the vessel 108 by gravity. Solids accumulating on the bottom 126 of vessel 108 are removed via a tank drain N5 located at the bottom 126 of the vessel 108. A washout connection N9 and one or more cleanout man ways M1 and M2 are also located in the tank 108 near the bottom 126 of the tank 108 that can be used in flushing and cleaning solids out the bottom of the tank 108. This new configuration of the baffle dish 5 eliminates the plugging experienced in prior separator designs and the associated downtime and costs of cleaning out the solids from those prior designs, thereby extending the run-time life and overall long-term separation effectiveness of the present invention 100.

A sixth feature is its oil conduit 6 that prevent re-entrainment of separated oil back into the water. Prior art designs focused on water quality improvement only. The present invention 100 provides for both water and oil quality improvement. In order to assure both improved oil and water quality, it is necessary to minimize re-entrainment of separated oil back into the water and to minimize the exposure of separated oil to the mixing energies of the inlet fluid. To accomplish this in the present invention 100, oil that collects on the underside or underneath 152 of the inverted upper spreader 5 flows through the oil conduit 6 from underneath the inverted upper spreader 5 into the oil layer 118 without having to travel through the inlet water turbulent zone 128 surrounding the tank fluid inlets 120. This assures that the quality of oil separated below the inverted upper spreader 5 is not deterred as it moves from the water layer or section 116 to the oil layer or section 118.

A seventh feature is its slide tube 7 for the water leg 130. In prior art designs the oil-water interface 114 was controlled externally by an ancillary level device. In the present invention 100, the level device is built into the tank 108. The level device is an internal water conduit or water leg 130. This water leg 130 differs from all others in that its level controlling spillover point 132 is adjustable in height. In order to render the spillover point 132 to be adjustable, the upper end 134 of the riser pipe 136 is machined smooth or fitted with a short section of smooth pipe. Then a special oversize pipe or slide tube 7 is slipped over the smoothed out section 134 of the riser pipe 136. The oversize pipe 7 is machined with two O-ring grooves 140 located near the bottom 142 of the oversize pipe 7, which are filled with appropriately sized O-rings 144. The O-rings 144 seal the oversized pipe 7 to the riser pipe 136, thereby forcing all water that flows upward around the riser pipe 136 to overflow into the top 146 of the oversized pipe 7. Thus, by raising or lowering the oversize pipe 7 telescopically relative to the riser pipe 136, this adjusts the level, elevation or height of the top 146 of the oversized pipe 7. And by raising or lowering the oversized pipe 7, the level or height of the oil-water interface 114 inside the tank 108 is also adjusted to a new fixed point. In this way an operator can make periodic adjustments to the separator 100 as needed without having to take the separator 100 out of operation.

An eighth feature is its engineered water spillover weir 8 that prevents separation upsets. Weirs have been used in the application of water distribution applications since the beginning of time. The science of weir length versus the crest height of water flowing over it at various rates is well understood and documented. However, while all tanks fitted with water legs provide for a weir area for water exiting the tanks, the relationship of weir area to flow has heretofore escaped most designers. This oversight causes wide variations in the level of the oil-water interface 114, a decided lack of control of the level of the oil-water interface 114, and results in both oil carryover in effluent water and water carryover in effluent oil. By sizing the water leg spillover weir 8 consistent with the known flow rate of the inlet water entering the inlet 1, the designer can minimize the otherwise significant variations in levels of the oil-water interface 114 and thereby assure a consistent effluent oil and water quality. Since every application for which the invention 100 is to be built has different flow rates, the sizing of the weir 8 must be and is done specific to the flow rates of the specific application for which the separator 100 is designed. Additionally, the pressure drop through the water leg 130 must be calculated on a case-by-case basis so the crest height over the weir 8, i.e. as defined by the elevation of the top 146 of the slide tube 7, is not sufficient to move the oil-water interface 114 more than a few inches from no-flow to full-flow conditions. This results in sizing the diameter of the pipe that forms the water leg 130 to minimize the pressure loss as the water flows through it.

A ninth feature is its engineered oil spillover weir 9 that prevents overflow of the tank or vessel 108. Prior art separator did not consider the fluid flow dynamics in the oil phase. The present invention takes this variable into account, and completely manages it to prevent tank overflows and resultant, wasteful, and hazardous oil spills. In order to accomplish this, a very large capacity spillover weir 9 is installed so the maximum elevation increase during high slug flows of oil is absorbed in a very shallow crest height over the weir 9 so the overall rise in oil elevation remains a very small fraction of the available space in each vessel 108. This assures that all separated oil is efficiently moved from the separator 100 to the adjacent oil storage tank (not illustrated) via the tank's oil outlet N3 without any exposure to the environment or loss of oil product. In so doing, it also assures that the elevation of the oil-water interface 114 remains constant so all separation is maximized, insuring that the effluent quality of oil leaving the tank 108 via the oil outlet N3 and the effluent quality of the clarified water leaving the tank via water outlet N2 remain constant.

A tenth feature is its external water leg adjuster 10 that provides fine tuning without shutdowns. A water leg adjuster 10 is provided with a water leg flange N7 located on the top of the tank 138 that is the adjustment mechanism for adjusting the height of the water leg 130 by raising or lowering the slide tube 7. The details and benefits of the adjustable height water leg 130 have previously been described. Tantamount to operating success is the need for operators to be able to make large adjustments to the level of the oil-water interface 114 during periods of start-up or restarts, and smaller, minor adjustments to the interface 114 during operations to account for changes in fluid density or changes in viscosity brought on by the heat of the summer and cold of the winter. The adjustable water leg 130 is designed expressly for this purpose. The adjuster 10 is a slide rod or worm gear 148 that connects to the internal slide tube 7 of the water leg 130, and extends through a combination lubricator and seal 150 to outside the vessel 108 where the operator can access it. By moving the rod or worm gear 148 up or down, the operator can adjust the elevation of the adjustable water leg spillover pipe formed by the top 146 of the slide tube 7, and thus the spillover point 132, and thereby change the elevation of the oil-water interface 114 within the vessel 108. This feature adds considerable value to the day-to-day operation of the separator 100.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An apparatus for separating oil well products comprising:
    a tank for receiving oil well products, an internal water leg that is adjustable in height, and
    adjustment means for adjusting the height of the internal water leg being provided externally on the tank.

2. An apparatus for separating oil well products according to claim 1 further comprising:
    an inverted upper spreader located immediately below tank fluid inlets located within the tank where oil well products enter the tank.

3. An apparatus for separating oil well products according to claim 2 further comprising:
    an engineered water spillover weir provided in association with the internal water leg, and said water spillover weir sized consistent with the flow rate of the oil well products entering the tank at the tank fluid inlets and sized to minimize the pressure loss as the water flows through the water spillover weir.

4. An apparatus for separating oil well products according to claim 3 further comprising:
    an engineered oil spillover weir, and said oil spillover weir sized so the maximum elevation increase during slug flows of oil is absorbed in a shallow crest height over the weir.

5. An apparatus for separating oil well products according to claim 4 further comprising:
    swirl wings provided in association with the tank fluid inlets so that the swirl wings direct oil well products entering the tank through the tank fluid inlets to spiral outward in the tank in a helical orientation.

6. An apparatus for separating oil well products according to claim 5 further comprising:
    a swirl wing baffle located immediately above the tank fluid inlets to minimize disturbance of an oil water interface located above.

7. An apparatus for separating oil well products according to claim 6 further comprising:
    a degassing chamber located within the tank ahead of the tank fluid inlets to remove free gases from the fluid prior to discharge into the tank via the tank fluid inlets.

8. An apparatus for separating oil well products according to claim 7 further comprising:
    a slide tube movably secured to the internal water leg as a means for adjusting the height of the water leg, and said adjustment means for adjusting the height of the internal water leg connecting to said slide tube to raise and lower said slide tube on said water leg.

9. An apparatus for separating oil well products according to claim 8 further comprising:
    an oil conduit extending from an underside of said inverted upper spreader upward into an oil layer located near the top of the tank to provide a path for oil to travel up into the oil layer without having to pass near a turbulent area surrounding the tank fluid inlets.

10. An apparatus for separating oil well products according to claim 9 further comprising:
    internal piping extending through the tank at ground level for both the oil well products inlet and for a separated water outlet.

11. An apparatus for separating oil well products comprising:
    a tank for receiving oil well products,
    swirl wings provided in association with tank fluid inlets so that the swirl wings direct oil well products entering the tank via the tank fluid inlets to spiral outward in the tank in a helical orientation,
    an internal water leg extending upward within the tank from above a lower portion of the tank so that water enters the water leg at the bottom of the water leg, and
    said water leg that is adjustable in height.

12. An apparatus for separating oil well products according to claim 11 further comprising:
    piping provided internally within the tank and extending through the tank at ground level for both oil well products inlet and separated water outlet.

13. An apparatus for separating oil well products according to claim 11 further comprising:
    a degassing chamber located within the tank such that free gases are removed from the oil well products prior to entering into the tank via the tank fluid inlets.

14. An apparatus for separating oil well products according to claim 11 further comprising:
    a swirl wing baffle located between the tank fluid inlets and an oil-water interface located above to minimize disturbance of an oil water interface within the tank.

15. An apparatus for separating oil well products according to claim 11 further comprising:
    an inverted upper spreader located below the tank fluid inlets, and
    an oil conduit extending from an underside of said inverted upper spreader upward into an oil layer located near the top of the tank to prevent re-entrainment of the oil by providing a path for oil to travel up to the oil layer without having to pass near a turbulent area surrounding the tank fluid inlets.

16. An apparatus for separating oil well products according to claim 15 further comprising:
    an engineered oil spillover weir provided in the oil layer as a means of removing oil from the tank, and said oil spillover weir sized so the maximum elevation increase during slug flows of oil is absorbed in a shallow crest height over the oil spillover weir.

17. An apparatus for separating oil well products according to claim 11 further comprising:
    a slide tube movably secured to the top of the internal water leg, and
    adjustment means for adjusting the height of the internal water leg being provided externally on the tank and connecting to said slide tube to raise and lower said slide tube as a means of adjusting the height of the water leg.

18. An apparatus for separating oil well products according to claim 17 further comprising:
    an engineered water spillover weir provided in association with the internal water leg, and said water spillover weir sized consistent with the flow rate of the oil well products entering the tank at the tank fluid inlets and sized to minimize the pressure loss as the water flows through the water spillover weir.

* * * * *